Aug. 4, 1931.                M. L. KUNTZ                1,816,908
                             DOUGH RAISER
                          Filed April 17, 1929
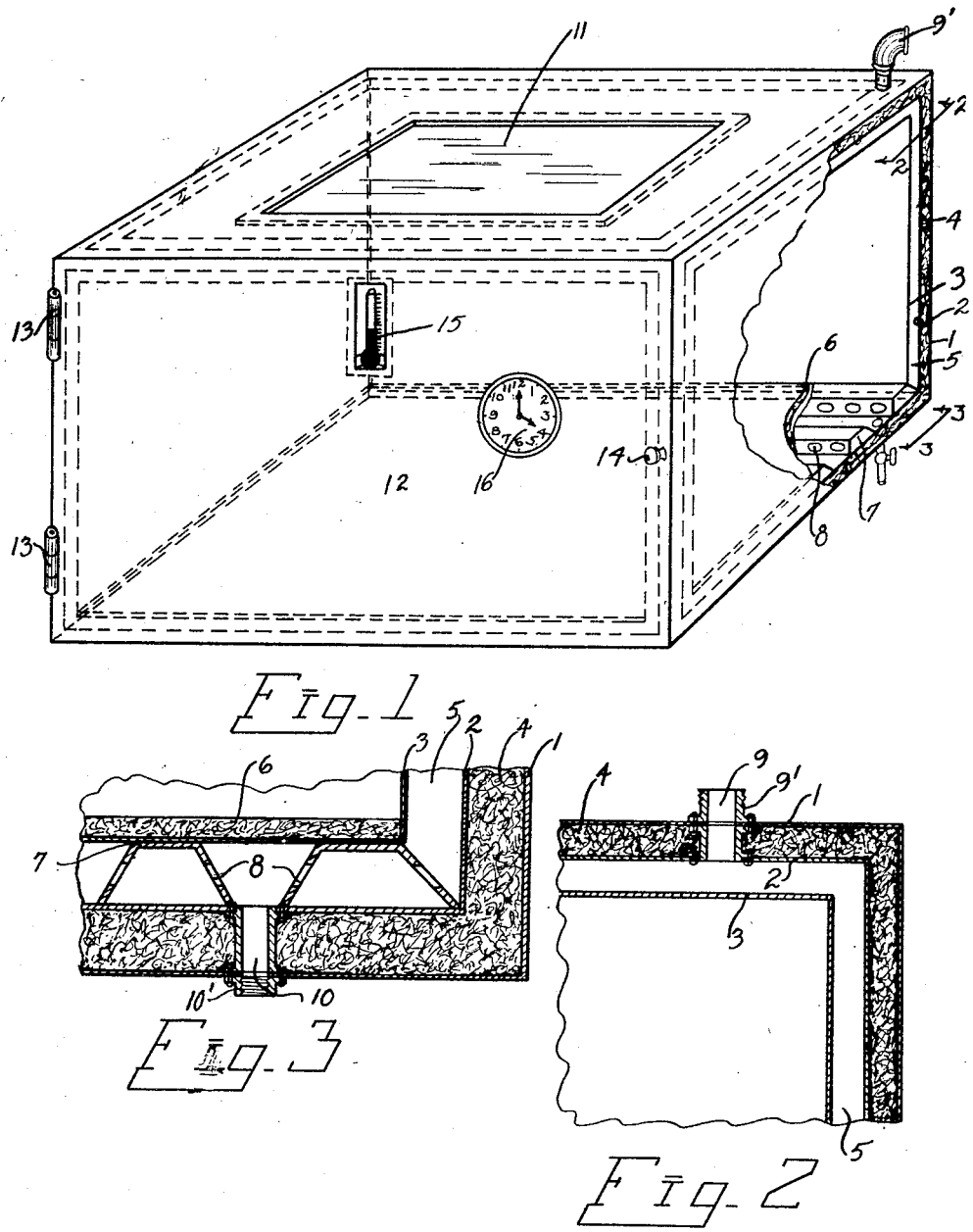
Minnie L. Kuntz Inventor
By Herbert E. Smith
                                      Attorney Patented Aug. 4, 1931

1,816,908

UNITED STATES PATENT OFFICE

MINNIE L. KUNTZ, OF WHITEFISH, MONTANA

DOUGH RAISER

Application filed April 17, 1929. Serial No. 355,952.

My present invention relates to improvements in dough raisers in which the invention is embodied in a closed cabinet or receptacle designed to receive the dough. The dough raiser is especially designed for domestic or household uses, and means are provided for heating the interior of the cabinet and for maintaining the heat at a uniform temperature in excess of that of the surrounding atmosphere.

By the utilization of the apparatus of my invention the rising of the dough, preparatory to baking, may be governed and regulated in order that the desired results may be accomplished in the bread or loaves made from the dough.

In carrying out my invention I utilize a cabinet or enclosure for the dough having heat insulated walls and an inner water jacket, for maintaining the temperature during a predetermined period of time for the rising of the dough.

The invention consists in certain novel combinations and arrangements of parts as will hereinafter be more fully set forth. In the accompanying drawings I have illustrated one complete example of the physical embodiment of my invention wherein the parts are combined and arranged according to the best mode I have thus far devised for the practical application of the principles of my invention.

Figure 1 is a perspective view of a dough raiser embodying my invention, parts being broken away for convenience of illustration.

Figure 2 is an enlarged detail sectional view at the line 2—2 of Figure 1, in the upper right hand corner of the cabinet.

Figure 3 is an enlarged sectional detail view, as at line 3—3 of Figure 1, illustrating the bottom portion of the cabinet and the drain device for the water jacket.

The cabinet as shown is preferably of rectangular shape and of suitable size for the purpose, and is fashioned with double walls 1 and 2 which may be of metal. The double walls are spaced apart, and within the inner wall of the double enclosure, a third wall 3 is provided to form the receptacle for the dough. Between the double walls 1 and 2 a layer 4 of heat insulating material is interposed, said material being of a fibrous nature, or of an any other suitable type of material that will prevent or retard the transmission of heat from the interior of the cabinet.

Between the walls 2 and 3 a space 5 is provided for water and when the water is heated, the heated liquid forms a water jacket for heating the interior of the inner case 3 in which the dough is located. A layer 6 of the heat insulating material may also be used to form the bottom of the heating chamber, and to strengthen the bottom of the chamber for the support of the dough.

Within the water jacket below the bottom of the heating chamber I provide a number of channel plates as 7 which are supported on the bottom wall of the insulating portion of the cabinet, and these plates in turn support the bottom of the heating chamber. The ends of the channel plates terminate adjacent the side insulating walls to permit free circulation of water in the lower part of the water jacket, and the side walls of these channel plates also have ports 8 therein to permit lateral flow of the water through the channel plates. The water is thus permitted to circulate throughout the water jacket to uniformly distribute the heat, and from the water jacket the heat is transmitted through the metal, inner casing 3, to the interior of the heating chamber.

The water may be pre-heated if desired, before filling the jacket through the intake nozzle 9 at the top of the cabinet, and from the nozzle the water flows down through a bushing, or sleeve 9', in the insulated wall of the cabinet to the interior of the water space.

At the bottom of the cabinet a drain cock 10 is connected with a bushing, or sleeve 10', in the bottom wall of the cabinet, and the water may readily be drained therefrom when desired, after having performed its required functions. In some instances an electric heating element may be introduced through the sleeve 9' when the intake nozzle is removed, to heat the water in the jacket.

Inspection, to determine the condition of the dough, may be made from time to time, through a glass panel or window 11 in the top of the cabinet, without necessity for recourse to opening the cabinet, and a door 12 provided with knob 14 is hinged at 13 to give access to the interior of the cabinet and to the heating chamber.

A thermometer 15 is set in the door to indicate the temperature of the water in the heating jacket, and a time indicator is shown at 16 mounted on the door. The indicator is used by setting its hands, for instance, with one hand to indicate the hour the dough is placed in the heating chamber and the other hand to indicate the hour for removal of the risen dough. Or the hands may indicate the time at which the dough was placed in the heating chamber, or in some instances the hands may be set to indicate the time at which the dough is to be removed from the heating chamber.

Having thus fully described my invention what I claim as new and desire to secure by Letters Patent is:—

A cabinet comprising double walls and a layer of heat insulating material between them, a spaced, interior casing forming a water space between the case and the double walls, said space having an inlet and an outlet for water, a transparent window in the top of the cabinet and a hinged door at the front of the cabinet, and ported channel plates located between the bottom of the case and the bottom of the cabinet.

In testimony whereof I affix my signature.

MINNIE L. KUNTZ.